United States Patent Office 3,447,851
Patented June 3, 1969

3,447,851
FERRIMAGNETIC LIGHT TRANSMISSION GARNETS
Joseph P. Remeika, Warren Township, Somerset County, and Darwin L. Wood, Murray Hill, N.J., assignors to Bell Telephone Laboratories, Incorporated, New York, N.Y., a corporation of New York
Filed Nov. 8, 1965, Ser. No. 506,665
Int. Cl. G02b 13/14
U.S. Cl. 350—1      7 Claims

ABSTRACT OF THE DISCLOSURE

Light transmission devices for use in the near infrared are discussed. These devices comprise single crystal bodies of ferrimagnetic rare earth iron garnet compositions. Divalent and tetravalent dopant ions such as $Ca^{2+}$, $Zn^{2+}$, $Mg^{2+}$, $Si^{4+}$, $Sn^{4+}$, and $Ge^{4+}$ are added to increase the percentage of trivalent iron in said compositions.

---

Figure 1:
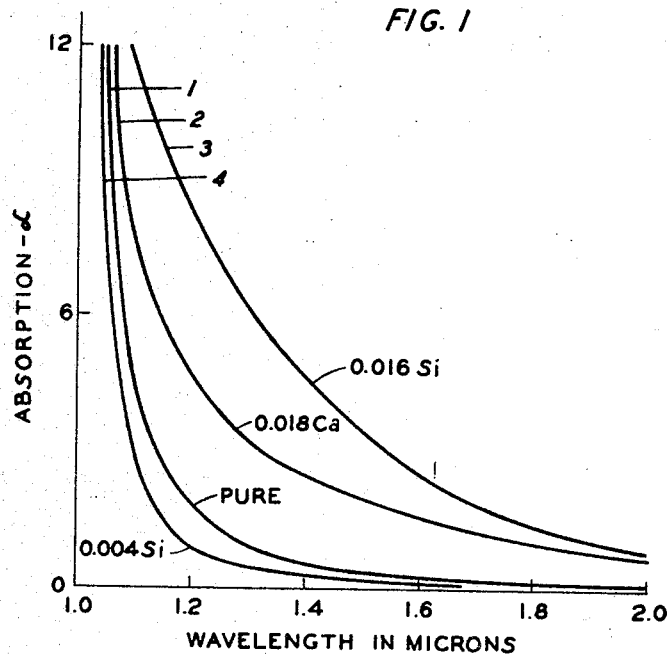

This invention relates to magnetic garnet compositions, to devices utilizing same, and to processes for making these materials.

Considerable interest has been generated in the use of YIG ($Y_3Fe_5O_{12}$) and the related rare earth iron garnets for use in optical modulators and related elements operating in the near infrared. In large part, this interest stems from the discovery that such compositions are unexpectedly highly transparent over the infrared frequency range from 2250 cm.$^{-1}$ to about 9000 cm.$^{-1}$ [Applied Physics Letters, volume 7, page 27 (1965)]. This was considered to be a particularly significant finding since so many laser oscillators operate in the infrared.

In particular, one of the more common gas lasers, that utilizing helium and neon, has a nominal output frequency of about 1.14 microns ($\mu$), or 8770 cm.$^{-1}$ ($1\mu$ equals $10^{-4}$ cm.).

While the transparency of the garnets for $1.14\mu$ emission is reasonable, it is recognized that this region of concern is at the high frequency edge of the "window." For example, the absorption $\alpha$ defined as $$\frac{1}{t} \log_{10} \frac{I_o}{I} = \alpha$$

for this frequency in YIG grown from pure starting materials is at a level of $\alpha = 2.5$ as compared with $\alpha = 1.0$ for a frequency of the order of $1.2\mu$. While an $\alpha$ value of $\alpha = 2.5$ is certainly at a level which permits significant optical experimentation, reduction of this $\alpha$ value by half or greater could well permit construction of a feasible operating optical communications system. Such an absorption level, coupled with the already recognized excellent magnetic properties of the garnet, gives rise to the highest figure of merit now obtainable for use in isolators and other devices based on a magneto-optic interaction.

We have studied the YIG and related rare earth garnet systems with a view to determine the cause for the smeared absorption evident at the 9000 cm.$^{-1}$ edge of the infrared window. We have now discovered the responsible mechanism and have also found a remedy.

We now know that a significant part of the absorption seen over the wavelength range from about $1.6\mu$ down to about $0.9\mu$ is due to the presence of either divalent or tetravalent iron ions. Here we are considering rather low levels, of the order of considerably less than one such ion per formula unit. The observation of even such low level deviations from stoichiometry is somewhat surprising in light of the traditional view of the YIG structure as being of near perfect stoichiometry. An explanation for such deviation from stoichiometry is probably to be found in sources such as vacancies in the metal sites and/or the unintentional presence of divalent or tetravalent impurities. The foundation for the latter cause is substantiated to some extent by the findings here reported.

We have found that the tendency to form iron ions of a valence other than three may be minimized by the inclusion of very small and precise amounts of doping ingredients. Accordingly, the tendency to form tetravalent iron is overcome, at least in part, by inclusion of a tetravalent ion such as silicon, tin, or germanium. Such tetravalent ion dopant, it would appear, satisfies the crystal requirements which otherwise result in the formation of tetravalent iron. In the other direction, the tendency to form divalent iron, probably due to an excess of tetravalent ion impurities of the very nature found suitable for increasing transparency in accordance with this invention, is minimized by inclusion of a divalent ion dopant such as calcium.

It is fortunate for the purposes of this invention that there were prior studies made on sintered garnet specimens relating electrical conductivity type and electrical resistivity to calcium and silicon doping (Solid State Physics in Electronics and Telecommunications, J. Verweel and B. J. M. Roovers, Academic Press, New York, page 475 [1960]). We have confirmed that calcium doping results in p-type conductivity and that silicon doping results in n-type conductivity. By this means, it is possible to examine a garnet specimen grown by any single crystal technique (flux growth, hydrothermal growth, flame fusion, etc.), and in this manner to determine which of our two classes of dopants and eventually what quantity of such additive will be effective in reducing absorption.

In accordance with this invention, it has therefore been discovered that additions of small amounts of either a tetravalent dopant such as silicon, tin, or germanium, or of a divalent dopant such as calcium, magnesium, or zinc to the starting materials results in a magnetic garnet composition such as YIG or any of the rare earth garnets having improved transparency for electromagnetic radiation in the infrared range of from about $1.6\mu$ to about $0.9\mu$. In terms of atoms per formula unit, it is observed that significant improvement requires a minimum inclusion of .001 atom. A maximum is observed to correspond with a level of about .1 atom in the same units. Particularly where the absorption is due to the presence of $Fe^{4+}$ iron ions, it has been found that the use of greater amounts of dopant does not result in crystalline samples evidencing the high degree of transparency which may be realized at lower doping levels.

Of course, the use of larger amounts of dopants within the permitted range indicated suggests the presence of divalent impurities for tetravalent additions and vice versa. This is confirmed by experiments in which both divalent and tetravalent ions are simultaneously added to the starting mixture. Again, where the maximum level of about .1 atom per formula unit of either indicated dopant is not exceeded, results may be identical to those realized by use of but a single dopant. The simultaneous use of both classes of dopants constitutes a specific embodiment in accordance with this invention.

Figure 2:
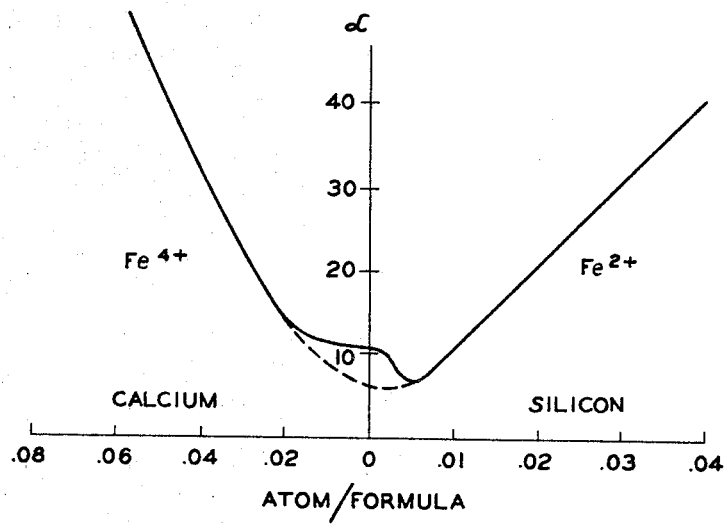
Figure 3:
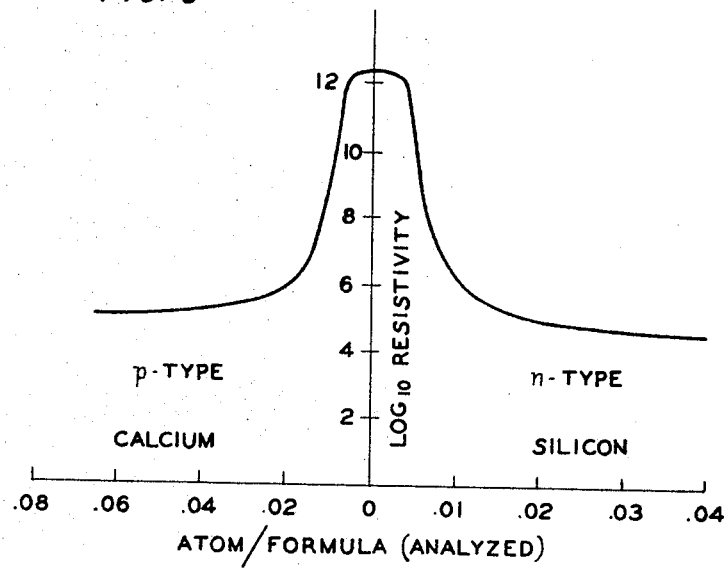
Figure 4:
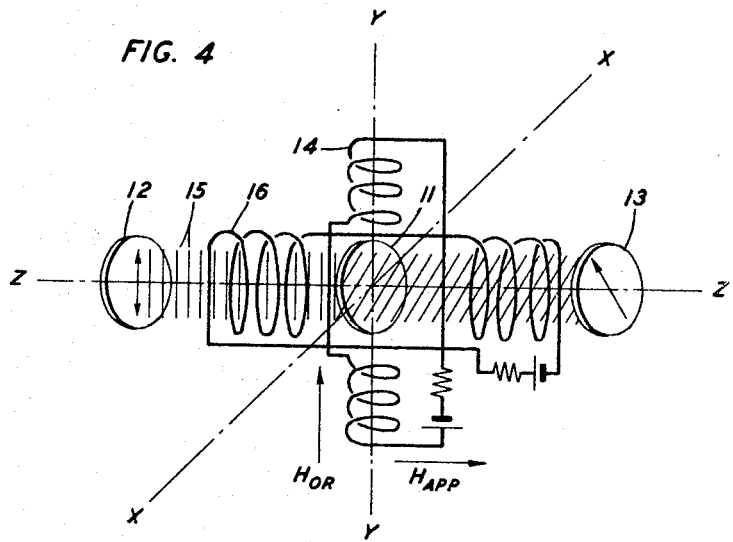

A detailed description of the invention is expedited by reference to the drawing, in which:

FIG. 1, on coordinates of absorption $\alpha$, and wavelength in microns, is a plot of the absorption spectra for four different YIG samples, one of which contains a doping level as described herein;

FIG. 2, on coordinates of absorption $\alpha$, and doping level of both a two-valent and a four-valent additive in units of atoms per formula, is a plot of the optical absorption for YIG at a wavelength of $1.06\mu$ for different doping levels;

FIG. 3, on coordinates of the logarithm of the resistivity and the doping level for a divalent and a tetravalent additive in units of atoms per formula, is a plot of the electrical resistivity for YIG for various dopant concentrations; and FIG. 4 is a schematic view of a light rotating device utilizing a garnet crystal in accordance with this invention.

Referring again to FIG. 1, there are four curves shown, curve 1 for a YIG sample grown from starting ingredients of such purity that the final product contained no more than .001 atom per formula unit of the final product of any divalent or tetravalent ion. Curve 2 corresponds with a YIG sample grown under the same conditions as that of curve 1 but corresponds with a sample grown from such starting materials as contained sufficient calcium to result in an analyzed end product including 0.018 atom per formula unit of that dopant. Curve 3 was plotted from a YIG sample again grown under equivalent conditions but from such starting materials as to result in an end product containing from 0.016 atom per formula of silicon. Curve 4 reflects the data measured on a YIG sample, again grown under equivalent conditions but from starting ingredients doped in accordance with this invention so as to result in a product containing 0.004 atom per formula of silicon.

A comparison of curves 1 and 4 reveals first the absorption characteristics of the best materials grown from extremely pure materials (curve 1) and the corresponding characteristics for a sample containing an optimum doping of silicon. It is seen that the largest improvement occurs in the region of the absorption edge at about 9000 cm.$^{-1}$, or about $1.11\mu$. The improvement in $\alpha$ so realized is of the order of 50 percent. The improvement decreases for increasing wavelength. It has been indicated that the inventive principles are usefully applied only out to a wavelength of the order of $1.6\mu$. Curves 2 and 3 are plotted from samples of YIG containing excessive doping levels of calcium and silicon, respectively. While it is permissible, as has been indicated, to utilize levels of this magnitude and indeed higher, so long as some impurity of the other of the two valence states is also present as compensation, the samples for which these data were plotted contained no such additional material. The $\alpha$'s for both of these samples are considerably higher than is that for the pure material (curve 1).

The absorption coefficient $\alpha$ for a fixed wavelength $1.06\mu$ is shown as a function of concentration in FIG. 2. Again, the concentrations for calcium to the left of the origin and for silicon to the right of the origin are those actually analyzed in the final crystal. Again, the curve can be displaced to right or to left by the additional inclusion of a divalent or a tetravalent ion, respectively. Above a concentration of 0.02 atom per formula, the rise in absorption with doping level is similar for the divalent and tetravalent ions except that the absorption per ion is stronger for the tetravalent. Since excessive tetravalent ion concentration resutls in $Fe^{2+}$, is follows that the absorption per ion is stronger for $Fe^{2+}$ than it is for $Fe^{4+}$.

From FIG. 2, it is seen that the very best optical grade material, always referring to transmission in the near infrared, occurs for low silicon content. Such material, evidencing the lowest absorption of all in the short wavelength edge of the infrared window, constitutes a preferred embodiment of this invention. The particular data of FIG. 2 were taken from a YIG sample containing only added silicon as a dopant. Similar minima have been observed for other tetravalent ion dopants such as tin and germanium and in other garnets such as europium-iron garnet and gadolinium-iron garnet. The experimental work is sufficient to indicate conclusively that the tendency to form $Fe^{4+}$ is almost completely compensated at some tetravalent ion level in all iron-containing garnets. Since this results in essentially all the irons ions being trivalent, that particular cause of absorption is removed and all that remains is the intrinsic absorption edge due to the trivalent iron. In similar fashion, the minimum absorption composition may be shifted toward greater tetravalent ion content by additionally including a divalent ion. For example, the minimum absorption in YIG has been made to occur at about 0.05 atom per formula of $Si^{4+}$ but also including about 0.1 atom per formula of $Ca^{2+}$.

FIG. 3, as has been noted, shows the relationship between conductivity type and resistivity for various doping levels of divalent and tetravalent ions. As theory would predict, and as Verweel and Roovers have reported, silicon doping results in n-type material, calicum doping, in p-type. A curve form of the type here presented is useful in determining the optimum conditions for satisfying the teachings of this invention. The particular curve here plotted is for flux-grown YIG. Since distribution coefficients for the various dopants differ with different conditions, different garnet compositions, and different crystal-growing procedures, this particular figure can only serve as a guide. The specific resistivities indicated are, however, general, regardless of the crystal-growing technique used.

To determine the type of additive indicated, the resistivity and conductivity type of the garnet sample, as grown, are measured.

Conductivity type is determined thermoelectrically.

Resistivity levels are measured by means of a standard four-point probe. The type and level then determine the curve position on the plot of FIG. 3, with silicon addition being indicated if the material is p-type and calcium addition being indicated if the material is n-type. One or two additional runs utilizing any specific set of growth parameters then serve to determine the required addition. The device of FIG. 4 is illustrative of a structure designed to modulate an infrared beam through a magneto-optic interaction. In this device, body 11 is shown for convenience as a thin disc of a single crystal of YIG or a rare earth iron garnet in accordance with this invention. The face of disc 11 is shown perpendicular to an axis designated the z axis. The disc lies in the plane of the orthogonal $x$ and $y$ axes, which are mutually orthogonal to the z axis. On either side of body 11 are mounted polarized prism 12 and analyzing prism 13. Prism 12 is aligned in the figure to pass light linearly polarized perpendicular to the y axis. Coils 14, mounted on both sides of garnet body 11 and along the y axis, set up a direct-current magnetic field designated $H_{or.}$. The field is sufficiently strong to saturate the ferrimagnetic body 11. The magnetization of garnet body 11 in such a direct-current field as $H_{or.}$ is aligned in the direction of the field. Coil 16 is energized to create a direct-current magnetic field $H_{app.}$ in a direction parallel to the dierction of propagation of light beam 15. Because of the presence of the magnetic field $H_{app.}$, the magnetization of the ferrimagnetic body 11 has a component in the direction of propagation of light beam 15. A rotation of beam 15 results upon passage through body 11, and analyzing prism 13 must be rotated to a new position in order to extinguish beam 15 upon its emergence from garnet body 11. For purposes of this figure, the rotation is shown as a clockwise rotation viewed from analyzing prism 13.

The structure of FIG. 4 is, of course, merely patricularly exemplary and representative of a multiude of devices well known to those skilled in the art, any of which may beneficially utilize a crystalline body of any of the materials herein a near infrared light system.

It is not considered within the province of this disclosure to describe the various suitable techniques of crystal growth. An adequate description of such procedures is set forth in Journal of the American Chemical Society, volume 78, pages 4259–4260 (Sept. 5, 1956); Physics and Chemistry of Solids, volume 5, No. 3, pages 202–207 (1958); and Journal of Applied Physics, volume 31, 5-suppl., pages 51–52S (1960) for flux growth; in Journal of the American Ceramic Society, volume 45, No. 2, pages 51–53 (1962), for hydrothermal growth; and in Journal of Applied Physics, volume 33, No. 4, pages 1616–1617 (April 1962), for flame fusion. The invention derives generally from the discovery of the relationship between absorption and the presence of either $Fe^{4+}$ or $Fe^{2+}$ ions in any of the ferrimagnetic garnets containing iron, together with the described techniques for eliminating or minimizing this cause of absorption, so resulting in superior garnet material for use in transmission devices over the wavelength range from 1.6 to 0.9 micron.

The inventive teachings are beneficially applied to the growth of all such garnet structures utilizing doping levels never less than 0.001 atom per formula unit and never exceeding 0.1 atom per formula unit of any one of the divalent or tetravalent ionic additives, calcium, zinc, magnesium, silicon, germanium and tin in any suitable form such as the oxides, carbonates, etc. The specific amount of such additive is to be determined in the manner described or by any other fashion so as to result in a decrease in the number of $Fe^{2+}$ or $Fe^{4+}$ ions. The resulting increase in the percentage of iron which is trivalent results in an increase in transparency over the frequency range indicated. The scope of the invention is to be so construed.

What is claimed is:

1. Light transmission device for use in the near infrared over the wavelength range of from $1.6\mu$ to $0.9\mu$, comprising a single crystal body mounted within the said device for passage of a light beam therethrough, the said body being of a ferrimagnetic garnet composition of the stoichiometry $M_3Fe_5O_{12}$, in which M is an element selected from the group consisting of yttrium and a rare earth element, the said composition additionally containing as an added dopant an ion selected from the group consisting of $Ca^{2+}$, $Zn^{2+}$, $Mg^{2+}$, $Si^{4+}$, $Sn^{4+}$, and $Ge^{4+}$, the said dopant having the effect of increasing the percentage of contained iron which is in the trivalent state, and means for producing a magnetization component within said body parallel to and in the path of said light beam.

2. Device of claim 1 in which said added dopant is present in an amount of from 0.001 to 0.1 atom per formula unit in accordance with said stoichiometry, the entirety of the said range of values each being at least 0.001 atom per formula unit greater than the level of such ion in the said body in the absence of such addition.

3. Device of claim 1 in which M is yttrium.
4. Device of claim 3 in which the said dopant is $Si^{4+}$.
5. Device of claim 4 in which the concentration of the said dopant is about 0.005 atom per formula unit based on the said stoichiometry in the final crystal.
6. Device of claim 1 in which M is europium.
7. Device of claim 1 in which M is gadolinium.

References Cited

UNITED STATES PATENTS 3,156,651   11/1964   Geller _____ 252—62.57

FOREIGN PATENTS 1,337,982   8/1963   France.

OTHER REFERENCES

Verweel et al.: "Solid State Physics in Electronics and Telecommunications," vol. 3, pp. 447–8 (1960).

TOBIAS E. LEVOW, *Primary Examiner.*

J. COOPER, *Assistant Examiner.*

U.S. Cl. X.R.

252—62.57, 300; 350—151